(12) United States Patent
Kiribuchi

(10) Patent No.: US 11,955,914 B2
(45) Date of Patent: Apr. 9, 2024

(54) PROCESSING DEVICE

(71) Applicant: OMRON Corporation, Kyoto (JP)

(72) Inventor: Takeshi Kiribuchi, Kyoto (JP)

(73) Assignee: OMRON CORPORATION, Kyoto (JP)

(\*) Notice: Subject to any disclaimer, the term of this patent is extended or adjusted under 35 U.S.C. 154(b) by 102 days.

(21) Appl. No.: 17/716,428

(22) Filed: Apr. 8, 2022

(65) Prior Publication Data

US 2022/0337185 A1 Oct. 20, 2022

(30) Foreign Application Priority Data

Apr. 15, 2021 (JP) ................................ 2021-068836

(51) Int. Cl.
  *H02P 27/08* (2006.01)
  *H02P 6/08* (2016.01)
  *H02P 7/28* (2016.01)

(52) U.S. Cl.
  CPC .............. *H02P 27/085* (2013.01); *H02P 6/08* (2013.01); *H02P 7/28* (2013.01)

(58) Field of Classification Search
  CPC ............. H02P 27/085; H02P 6/08; H02P 7/28
  See application file for complete search history.

(56) References Cited

U.S. PATENT DOCUMENTS

| | | | | |
|---|---|---|---|---|
| 7,187,229 B2* | 3/2007 | Pelly | ..................... | H02M 5/458 327/551 |
| 8,476,853 B2* | 7/2013 | Vanko | ..................... | H02H 3/247 318/494 |
| 10,447,225 B2* | 10/2019 | Pei | ........................... | H03D 3/08 |
| 2004/0008527 A1* | 1/2004 | Honda | ..................... | H02M 1/12 363/39 |
| 2014/0111176 A1* | 4/2014 | Nishimura | .............. | H02M 1/14 333/172 |
| 2015/0318791 A1* | 11/2015 | Baumann | ................ | H02P 27/06 318/504 |

OTHER PUBLICATIONS

Yokoo. "A Method to Design a Damping Control System for a Field Oriented Controlled Induction Motor Traction System for DC Electric Railway Vehicles." IEEJ Transactions on Industry Applications. 2015: 622-631. vol. 135, No. 6. English abstract provided.

\* cited by examiner

*Primary Examiner* — Rina I Duda
(74) *Attorney, Agent, or Firm* — ROSSI, KIMMS & McDOWELL LLP

(57) ABSTRACT

Voltage fluctuations on a power feeding path for feeding power to a motor controller are reduced. A processing apparatus reduces voltage fluctuations on a power feeding path for feeding power from a direct current power supply to at least one motor controller. The apparatus includes a filter circuit and a controller. The filter circuit includes a plurality of predetermined units each including a circuit element and a semiconductor switch. The circuit element includes at least one predetermined passive element. The semiconductor switch controls a current to be fed to the circuit element. The filter circuit is connected to the power feeding path. The controller controls switching of the semiconductor switch included in each of the plurality of predetermined units in the filter circuit to reduce voltage fluctuations or current fluctuations of direct current on the power feeding path.

7 Claims, 12 Drawing Sheets

PROCESSING DEVICE

CROSS-REFERENCE TO RELATED APPLICATION

This application claims priority to Japanese Patent Application No. 2021-068836 filed on Apr. 15, 2021, the contents of which are incorporated herein by reference.

FIELD

The present invention relates to a processing apparatus that reduces voltage fluctuations on a power feeding path for feeding power from a direct-current (DC) power supply to motor controllers.

BACKGROUND

Systems used at factories or other facilities (e.g., systems including robots and their controllers) may include multiple electric motors that are driven by pulse-width modulation (PWM) using multiple servo drivers installed at remote positions. Such a system is to reduce radiation noise from long cables connecting electric motors and servo drivers and thus cannot increase the switching speed, and also use many cables for connecting the electric motors and the servo drivers.

A system responding to these issues may include, near the respective electric motors, devices having the same structure as the servo drivers but each excluding a converter (hereafter referred to as motor controllers), and a single DC power supply for feeding power to these motor controllers with a DC bus. However, the system with this structure may have voltage fluctuations (oscillations) on the DC bus due to interference between an LC circuit connected to the DC bus and the motor controllers (refer to, for example, Non-Patent Literature 1).

CITATION LIST

Non-Patent Literature

Non-Patent Literature 1: Masashi Yoko; Keiichiro Kondo, A Method to Design a Damping Control System for a Field Oriented Controlled Induction Motor Traction System for DC Electric Railway Vehicles. IEEJ Transactions on Electrical and Electronic Engineering D, 2015, Vol.135, No.6, 622-631

SUMMARY

Technical Problem

Various factors can cause such voltage fluctuations on the power feeding path (or the above DC bus) from the DC power supply to the motor controllers. For example, any resonance on the power feeding path resulting from the operations of any motor that receives a drive current under control by the corresponding motor controller may cause voltage fluctuations. In response to this issue, one or more aspects of the present invention are directed to a technique for reducing voltage fluctuations on a power feeding path for feeding power to motor controllers.

Solution to Problem

A processing apparatus according to one aspect of the present invention is an apparatus for reducing voltage fluctuations on a power feeding path for feeding power from a direct current power supply to at least one motor controller. The apparatus includes a filter circuit and a controller. The filter circuit includes a plurality of predetermined units each including a circuit element and a semiconductor switch. The circuit element includes at least one predetermined passive element. The semiconductor switch controls a current to be fed to the circuit element. The filter circuit is connected to the power feeding path. The controller controls switching of the semiconductor switch included in each of the plurality of predetermined units in the filter circuit to reduce voltage fluctuations or current fluctuations of direct current on the power feeding path.

In the above processing apparatus, the filter circuit may adjust a resonance characteristic across the filter circuit by switching the semiconductor switch included in each of the plurality of predetermined units. The controller may control the switching of the semiconductor switch based on a rotation speed of a motor receiving a drive current fed from the at least one motor controller or a pulse-width modulation frequency of the at least one motor controller to reduce voltage fluctuations or current fluctuations of the direct current on the power feeding path.

Factors for such voltage fluctuations on the power feeding path for feeding power to the motor controllers include the rotation speed of any motor associated with the frequency of a drive current generated by the corresponding motor controller and the PWM frequency in any motor controller. Variations in the rotation speed of any motor or the frequency of a drive current affected by the PWM frequency in any motor controller closer to the resonance frequency on the power feeding path can cause electrical resonance that may cause voltage fluctuations. In response to this, the processing apparatus includes the filter circuit connected to the power feeding path. The controller controls the switching of the semiconductor switch included in each of the predetermined units in the filter circuit.

Each predetermined unit includes the circuit element and the semiconductor switch. The semiconductor switch is switched to control the current to be fed to the circuit element. Examples of the circuit element include passive elements such as capacitors, inductors, and resistors. The circuit element may be a capacitor, an inductor, a resistor, or a combination of these. The semiconductor switches are switched to allow the filter circuit including such predetermined units to adjust the resonance characteristic across the filter circuit. Examples of the resonance characteristic include the resonance frequency and the quality (Q) factor. The controller controls the switching of each semiconductor switch as described above to adjust, for example, the resonance frequency of the filter circuit to a frequency that has a sufficiently large difference from the frequency of the drive current associated with the motor rotation speed and the PWM frequency in the corresponding motor controller. This structure thus reduces DC voltage fluctuations or current fluctuations on the power feeding path.

In the above processing apparatus, the controller may control the switching of the semiconductor switch in each of the plurality of predetermined units to cause a resonance frequency on the power feeding path connected to the filter circuit to be out of a predetermined frequency range having a center frequency being a frequency of the drive current based on the rotation speed of the motor or the pulse-width modulation frequency in the at least one motor controller. This structure more effectively reduces DC voltage fluctuations or current fluctuations on the power feeding path.

In another example, in the above processing apparatus, the controller may detect voltage fluctuations or current fluctuations of the direct current on the power feeding path, and control the switching of the semiconductor switch based on a result of detection to reduce voltage fluctuations or current fluctuations of the direct current on the power feeding path and to adjust an impedance on the power feeding path connected to the filter circuit. Voltage fluctuations may occur on the power feeding path when the impedance is smaller in a portion controlled by any motor controller including the motor (e.g., a portion including an inverter circuit and the motor) than on the power feeding path. The switching control is thus performed over the semiconductor switches to lower the peak impedance on the power feeding path, thus reducing voltage fluctuations on the power feeding path.

In the processing apparatus described above, the predetermined units in the filter circuit may have structures other than described herein. For example, each of the plurality of predetermined units may be located between a positive wire and a negative wire included in the power feeding path. For example, each of the predetermined units may be arranged in parallel or in series between the positive wire and the negative wire. In another example, each of the plurality of predetermined units may be connected to a positive wire or a negative wire included in the power feeding path. For example, each of the predetermined units may be arranged in parallel or in series to the positive wire or the negative wire. Each of the predetermined units included in the filter circuit may include circuit elements of the same type and a semiconductor switch, or may include circuit elements of two or more types and a semiconductor switch.

In the above processing apparatus, the at least one motor controller may include a plurality of motor controllers connected to the power feeding path, and power from the direct current power supply may be distributed to the plurality of motor controllers. In other words, the processing apparatus according to one or more aspects of the present invention may be used for any structure for feeding DC power to multiple motor controllers with a power feeding path, and controlling the switching of each semiconductor switch reduces DC voltage fluctuations or current fluctuations on the power feeding path.

The above processing apparatus may have the structures according to one or more aspects. The processing apparatus according to a first aspect may include a connector including a pair of input terminals and a pair of output terminals electrically connected to the pair of input terminals, and the pair of input terminals and the pair of output terminals may be connected to a positive wire and a negative wire included in the power feeding path. The processing apparatus according to a second aspect may be placed in the direct current power supply to cause the power feeding path to receive an output from the filter circuit. In the processing apparatus according to a third aspect, the at least one motor controller may include an inverter that converts direct current being fed into alternating current to drive a servo motor. The processing apparatus according to the third aspect may be placed in the at least one motor controller to cause the inverter to receive an output from the filter circuit. The processing apparatus according to one or more aspects of the present invention may have structures other than the structures according to the three aspects described above.

Advantageous Effects

The technique reduces voltage fluctuations on the power feeding path for feeding power to the motor controllers.

DETAILED DESCRIPTION

Figure 1:
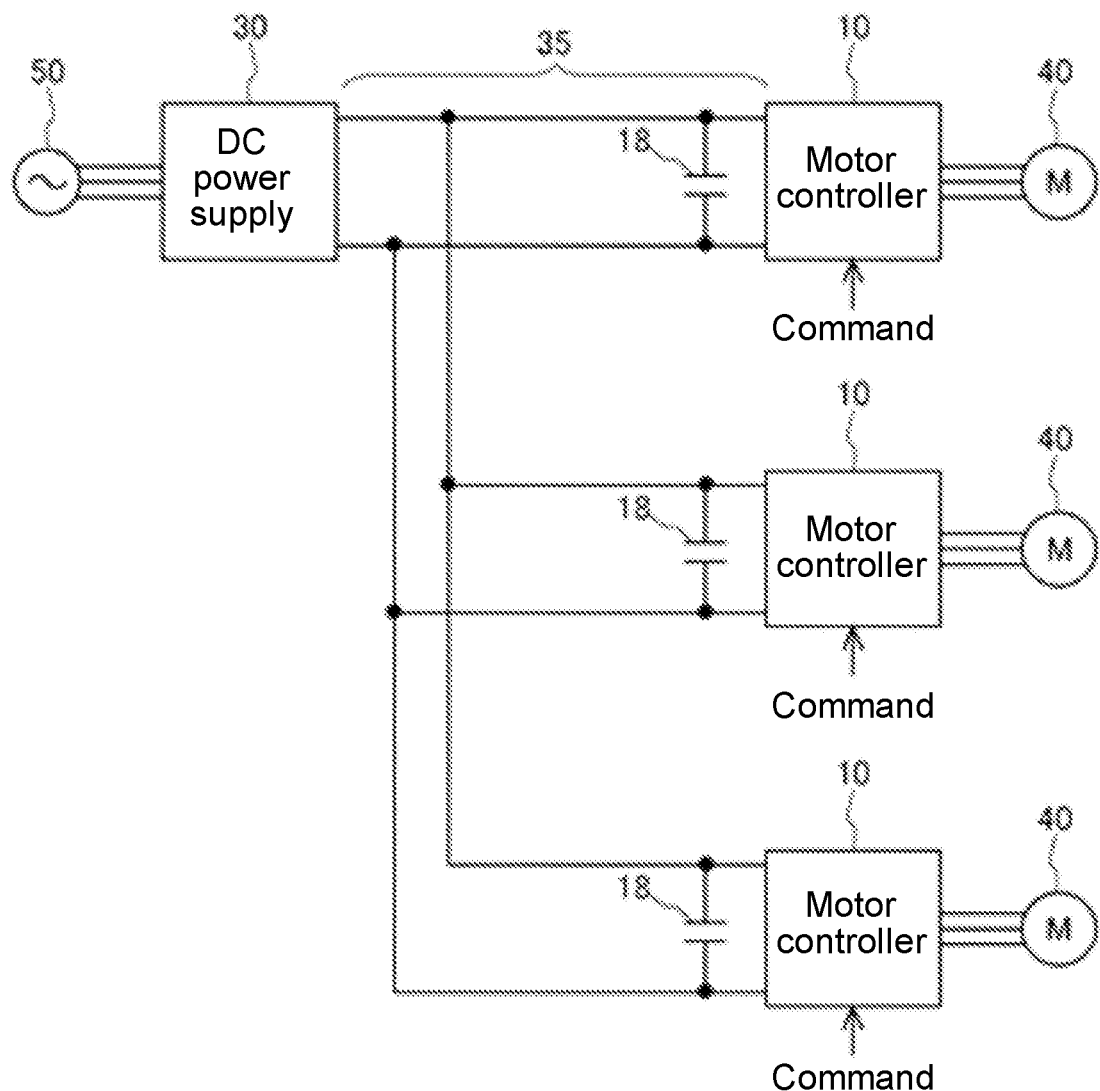
FIG. 1 is a schematic diagram of a servo DC power supply system according to an embodiment of the present invention.
Figure 2:
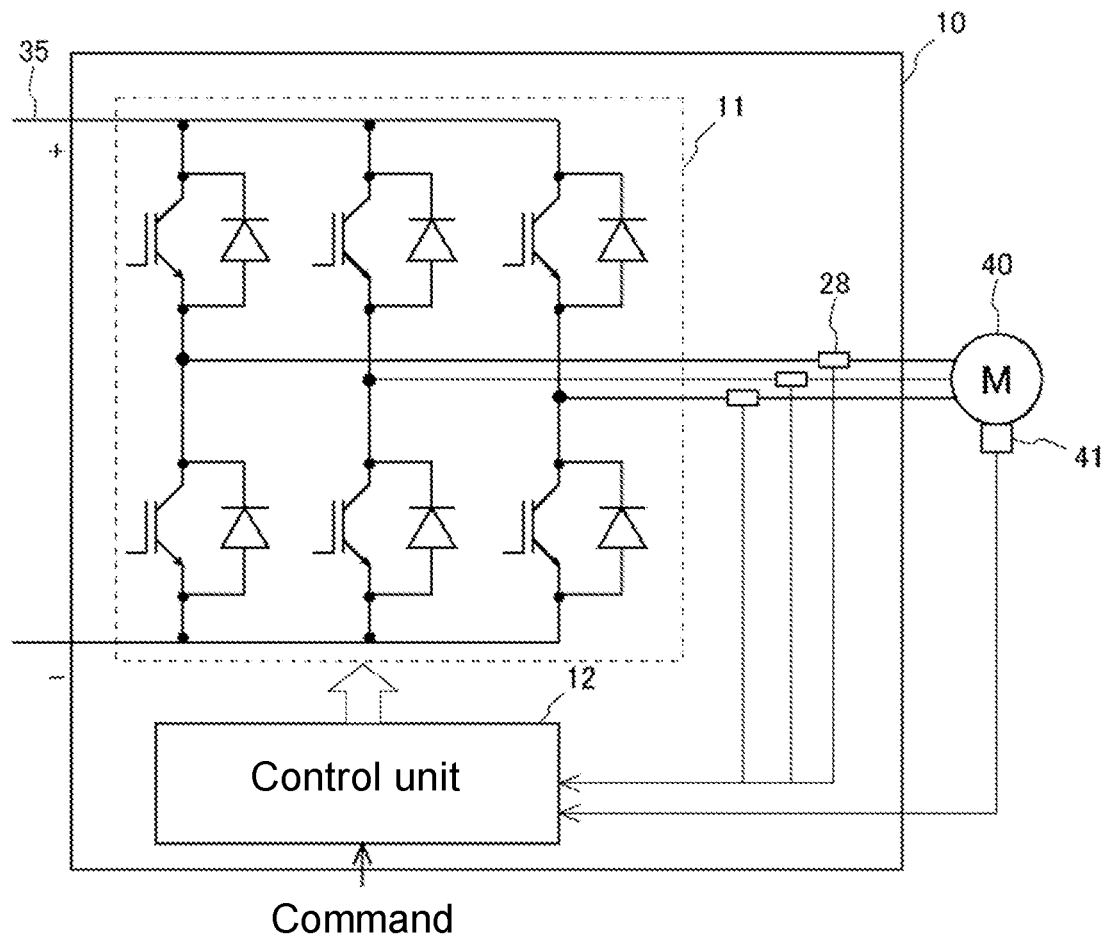
FIG. 2 is a schematic diagram of a motor controller included in the servo DC power supply system.

Embodiments of the present invention will now be described with reference to the drawings. FIG. 1 is a schematic diagram of a servo direct-current (DC) power supply system according to an embodiment of the present invention. FIG. 2 is a schematic diagram of a motor controller 10 included in the servo DC power supply system.

First Embodiment

As shown in FIG. 1, the servo DC power supply system according to the present embodiment includes a DC power supply 30, multiple motor controllers 10, and a power feeding path 35 connecting the DC power supply 30 and the motor controllers 10. The DC power supply 30 outputs a predetermined DC voltage. The DC power supply 30 includes an internal power supply unit 31 (refer to FIG. 6 described later). The power supply unit 31 outputs a predetermined DC voltage. The power supply unit 31 may convert three-phase alternating current (AC) from a three-phase AC power supply 50 to a DC voltage, or may convert single-phase AC to a DC voltage. The power supply unit 31 may be a rectifier including a diode (e.g., a full wave rectifier) or an AC-DC converter including a switching element (e.g., a power regenerative converter). The power supply unit 31 may be a rechargeable battery. Each motor controller 10 controls a servo motor 40 (hereafter simply, a motor 40) in accordance with commands (e.g., position commands or speed commands) from a programmable logic controller (PLC) or another host device. As shown in FIG. 2, each motor controller 10 includes an inverter 11 and a control unit 12.

The inverter 11 converts a DC voltage input from the DC power supply 30 through the power feeding path 35 into three-phase AC. The inverter 11 includes a leg for a U phase, a leg for a V phase, and a leg for a W phase that are connected in parallel between a positive power line and a negative power line. The motor controller 10 includes a current sensor 28 for measuring an output current from each leg included in the inverter 11.

The control unit 12 controls the inverter 11 with pulse-width modulation (PWM) in accordance with commands from the host device (e.g., the PLC). The control unit 12 includes a processor (e.g., a microcontroller or a central processing unit, or CPU) and its peripheral circuits. The control unit 12 receives signals from the current sensors 28, signals from an encoder 41 (an absolute encoder or an incremental encoder) attached to the motor 40.

As shown in FIG. 1, the power feeding path 35 includes multiple power cables to distribute and feed power (current) from the DC power supply 30 to the motor controllers 10 included in the servo DC power supply system. The power feeding path 35 typically includes smoothing capacitors 18 at its connections to the respective motor controllers 10 (between the power supply terminals of each motor controller 10).

Figure 3:
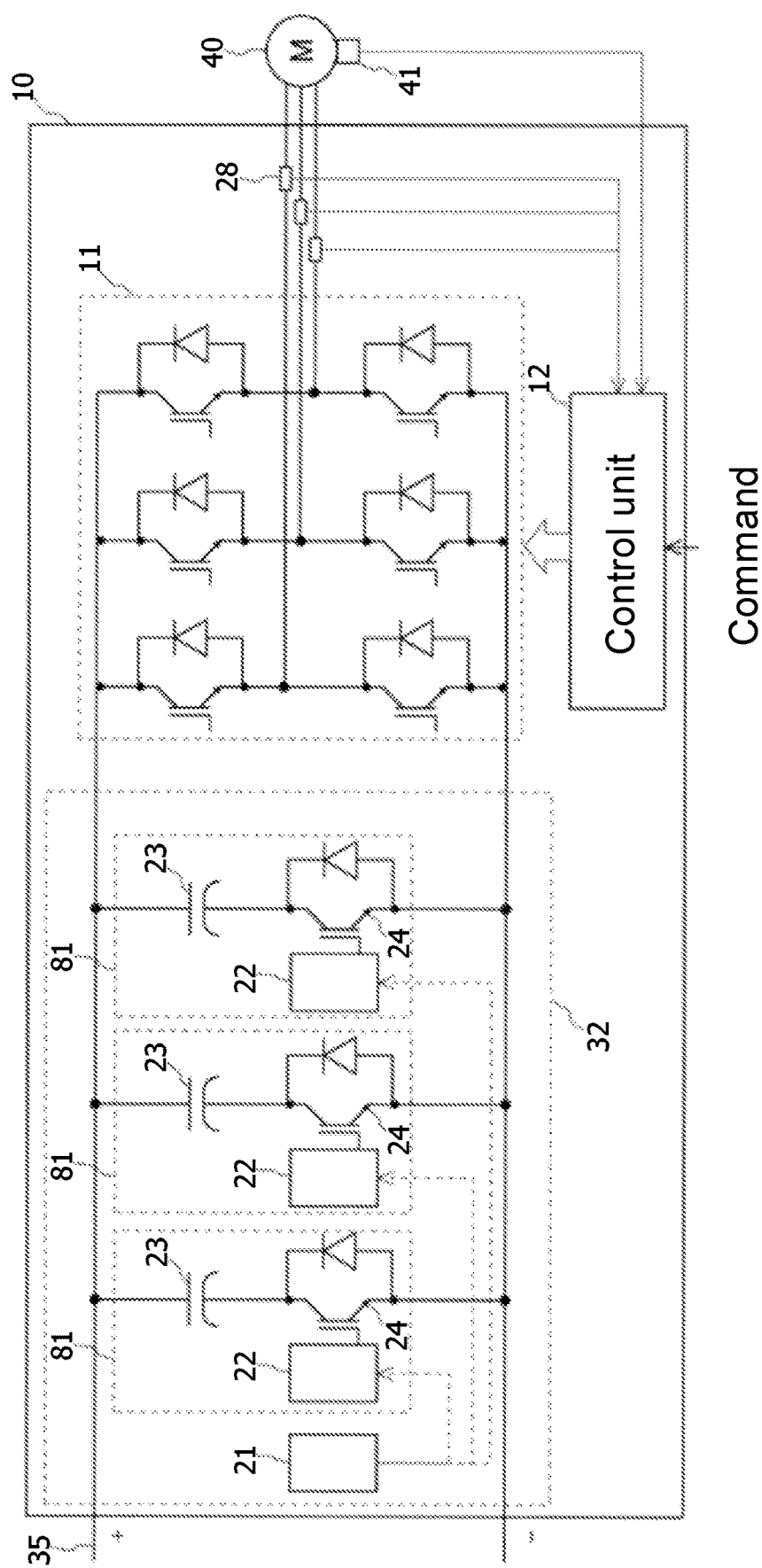
FIG. 3 is a first schematic diagram of a DC power supply included in the servo DC power supply system.

FIG. 3 is a schematic diagram of the motor controller 10 included in the servo DC power supply system according to the present embodiment. As illustrated, the motor controller 10 includes the inverter 11 and a filter circuit 32. The filter circuit 32 is placed at a connection to the power feeding path 35 in the motor controller 10. The filter circuit 32 receives DC power on the power feeding path 35 and outputs the DC power to the inverter 11.

The filter circuit 32 stabilizes the DC on the power feeding path 35. As illustrated, the filter circuit 32 includes a control circuit 21 and multiple stabilizers 81 between the positive and negative power lines (three stabilizers 81 in the example shown in FIG. 3). Each of the stabilizers 81 includes a series-connector of a capacitor 23 and a transistor 24 that functions as a semiconductor switch and a drive 22 for the transistor 24. The drive 22 drives the transistor 24 that functions as a semiconductor switch by applying a voltage to the gate of the transistor 24 in response to a control signal from the control circuit 21.

The control circuit 21 receives input information about the rotation speed of the motor 40 included in a command provided to the control unit 12 included in the motor controller 10 from the host device. Based on the information about the rotation speed, the control circuit 21 applies a voltage to the respective drives 22 for the multiple stabilizers 81 to control the switching of the corresponding transistors 24.

On the power feeding path 35, L1 is the inductance on the power feeding path 35 and C1 is the sum of the capacitance on the power feeding path 35 and the capacitance of the smoothing capacitor 18, and C2 is the capacitance of the capacitor 23 as a passive element included in each stabilizer 81 in the filter circuit 32. When the transistor 24 included in one stabilizer 81 alone is turned on by the control circuit 21 (case 1), when the transistors 24 in two stabilizers 81 are turned on by the control circuit 21 (case 2), and when the transistors 24 in all the stabilizers 81 are turned on by the control circuit 21 (case 3), the power feeding path 35 has the resonance frequencies written below.

Case 1

$$f1 = \frac{1}{2\pi\sqrt{L1 \cdot (C1 + C2)}}$$ Formula 1

Case 2

$$f2 = \frac{1}{2\pi\sqrt{L1 \cdot (C1 + 2 \cdot C2)}}$$ Formula 2

Case 3

$$f3 = \frac{1}{2\pi\sqrt{L1 \cdot (C1 + 3 \cdot C2)}}$$ Formula 3

In this state, f3<f2<f1.

Figure 4:
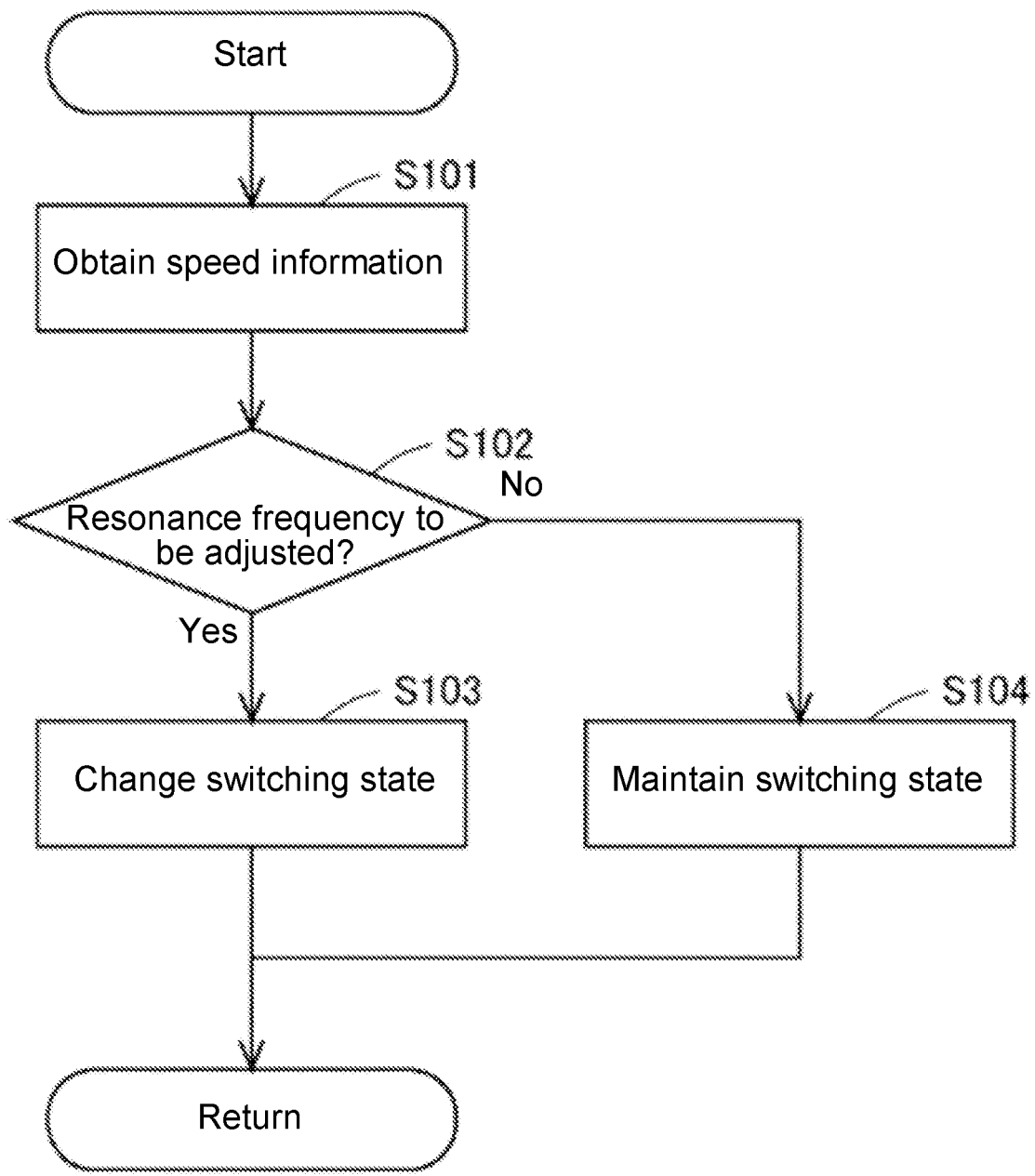
FIG. 4 is a flowchart of a control procedure for reducing voltage fluctuations performed by a processing apparatus included in the DC power supply.

The control circuit 21 controls the switching of the transistors 24 in this manner to control the resonance frequency on the power feeding path 35. The switching control over the transistors 24 performed by the control circuit 21 in each motor controller 10 will now be described with reference to FIG. 4. The process shown in FIG. 4 is performed by the control circuit 21 repeatedly executing a predetermined control program at predetermined intervals. In S101, speed information (information about the rotation speed) is obtained for the motor 40 corresponding to each motor controller 10 in the servo DC power supply system shown in FIG. 1.

In S102, the determination is performed as to whether the resonance frequency of the filter circuit 32 is to be adjusted. More specifically, when the resonance frequency on the power feeding path 35 derived from the switching state (either on or off) of the transistor 24 included in each stabilizer 81 at the present time falls within a predetermined frequency range having the center frequency being the frequency of the drive current of the motor 40, the resonance frequency of the filter circuit 32 is determined to be adjusted. The processing advances to S103 in response to an affirmative determination result obtained in S102, and advances to S104 in response to a negative determination result obtained in S102. In S103, the switching state of the transistor 24 included in each stabilizer 81 in the filter circuit 32 is changed to have the resonance frequency on the power feeding path 35 out of the predetermined frequency range having the center frequency being the frequency of the drive current of the motor 40. In S104, the switching state of the transistor 24 included in each stabilizer 81 in the filter circuit 32 is maintained due to a lower likelihood of resonance causing voltage fluctuations on the power feeding path 35.

In accordance with the control shown in FIG. 4 as described above, the control circuit 21 controls the switching of the transistors 24 to allow the resonance frequency on the power feeding path 35 to be out of the predetermined frequency range having the center frequency being the frequency of the drive current based on the rotation speed of each motor 40. This structure effectively avoids voltage fluctuations on the power feeding path 35 caused by the resonance of the DC voltage resulting from motor driving.

The resonance frequency on the power feeding path 35 may fall within the predetermined frequency range having the center frequency being the frequency of the drive current of the motor 40 although the switching state of the transistor 24 in each stabilizer 81 in the filter circuit 32 is adjusted. In this case, the switching state of the transistor 24 may simply be adjusted to maximize the difference between the frequency of the drive current of the motor 40 and the resonance frequency on the power feeding path 35.

In the control shown in FIG. 4, the control circuit 21 receives information about the rotation speed of the motor 40 and controls the switching of the transistors 24 based on the information about the rotation speed. In some embodiments, the control circuit 21 may receive information about the PWM frequency of the inverter 11. The control circuit 21 then controls the switching of the transistors 24 based on the information about the PWM frequency to reduce voltage fluctuations on the power feeding path 35 caused by the switching operation in the inverter 11.

Modifications

Figure 5:
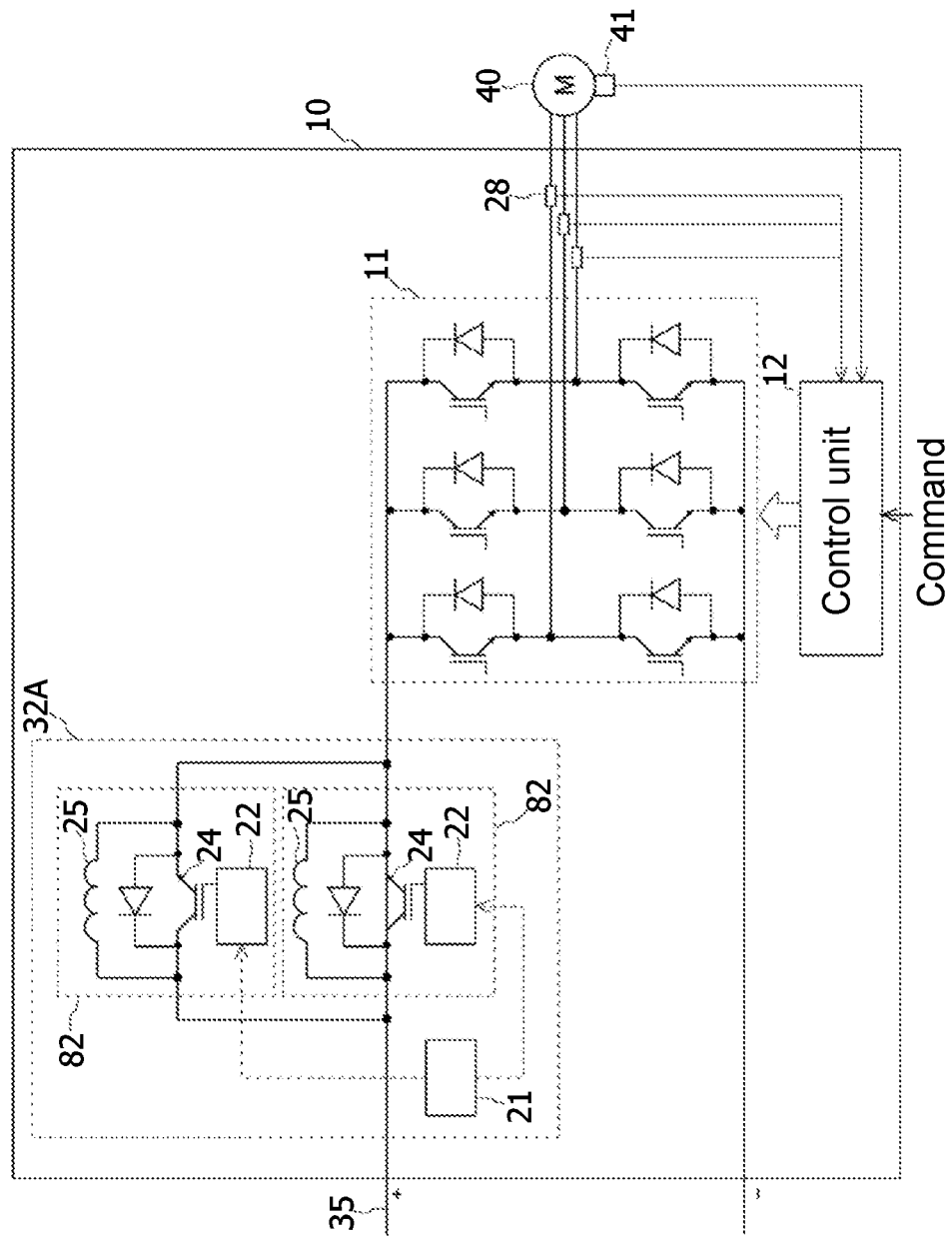
FIG. 5 is a second schematic diagram of a DC power supply included in the servo DC power supply system.

A filter circuit to be included in a DC power supply 30 according to a modification will now be described with reference to FIG. 5. A filter circuit 32A in the modification is placed on either a positive power line or a negative power line. In FIG. 5, the filter circuit 32A is placed on the positive power line from the power supply unit 31. The filter circuit 32A includes a control circuit 21 and multiple stabilizers 82 (two stabilizers 82 in the example shown in FIG. 5). Each of the stabilizers 82 includes an inductor 25 as a passive element and a parallel-connector for a transistor 24 that functions as a semiconductor switch, and a drive 22 for the transistor 24. In the filter circuit 32A, the stabilizers 82 are connected in parallel to each other. The control circuit 21 and the drive 22 are substantially the same as the corresponding components in the first embodiment described above, and will not be described in detail.

The control circuit 21 receives information about the rotation speed of the motor 40 in the present modification as well. Based on the information about the rotation speed, the control circuit 21 applies a voltage to the respective drives 22 for the multiple stabilizers 82 to control the switching of the corresponding transistors 24. This structure can also control the resonance frequency on the power feeding path 35.

Each stabilizer 82 may include, as passive elements, a resistor, in addition to the capacitor and the inductor described above. Each stabilizer 82 may combine passive elements selected from a capacitor, an inductor, and a resistor as appropriate.

Second Embodiment

In the above embodiment, the resonance frequency on the power feeding path 35 is controlled through the switching control over the transistors 24 to reduce voltage fluctuations. In the present embodiment, DC voltage fluctuations or current fluctuations on the power feeding path 35 are detected. Based on the detection results, the switching control may be performed over the transistors 24 to adjust the impedance on the power feeding path 35 including the filter circuit 32 or 32A. This reduces voltage fluctuations or current fluctuations on the power feeding path 35.

Figure 6:
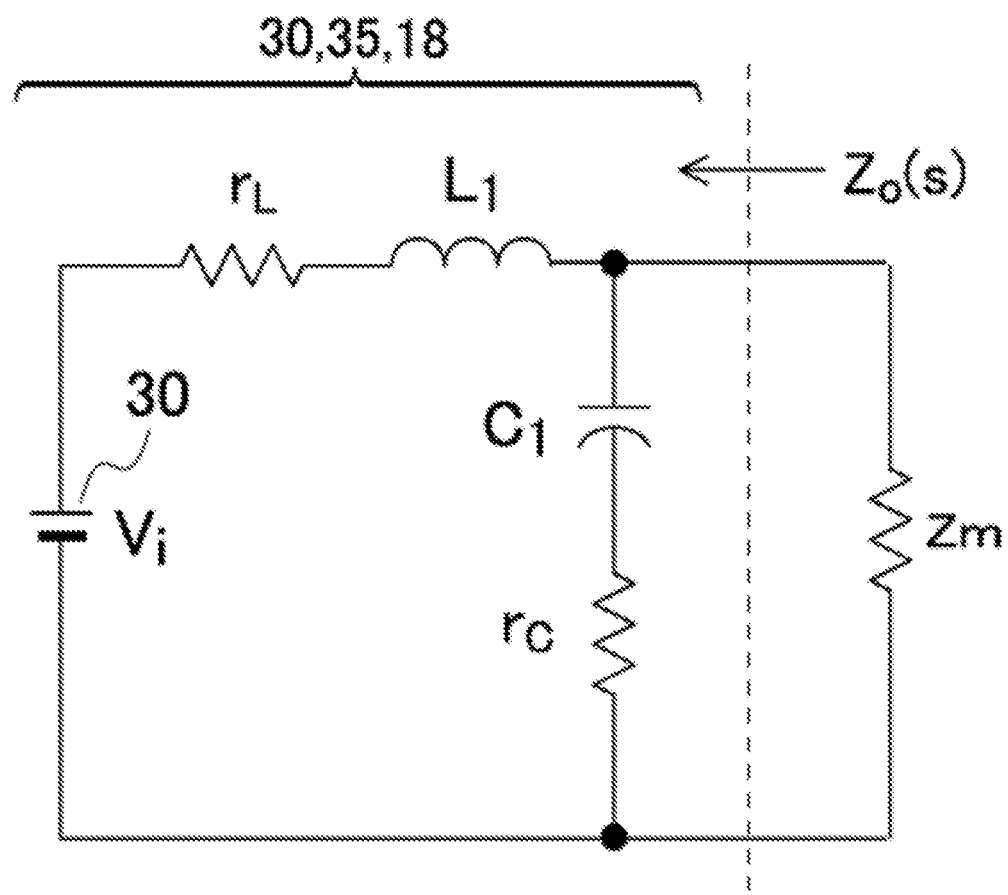
FIG. 6 is a diagram of an equivalent circuit for the servo DC power supply system.

More specifically, the servo DC power supply system according to one or more embodiments of the present disclosure (a known servo DC power supply system) may be expressed as an equivalent circuit shown in FIG. 6 in which Zm is the impedance at the motor (the portion including the multiple motor controllers 10 and the multiple motors 40 in FIG. 1). In FIG. 6, L1 is the inductance on the power feeding path 35, rL is the series resistance for the inductor L1, C1 is the sum of the capacitance on the power feeding path 35 and the capacitance of the smoothing capacitor 18, and rC is the series resistance for the capacitance C1.

The peak value $Z_{o\_peak}$ of the output impedance at the power supply in the equivalent circuit (FIG. 6) is written using the formula below.

$$Z_{o\_peak} = \frac{L_1}{C_1(r_L + r_C)} \quad \text{Formula 4}$$

Figure 7:
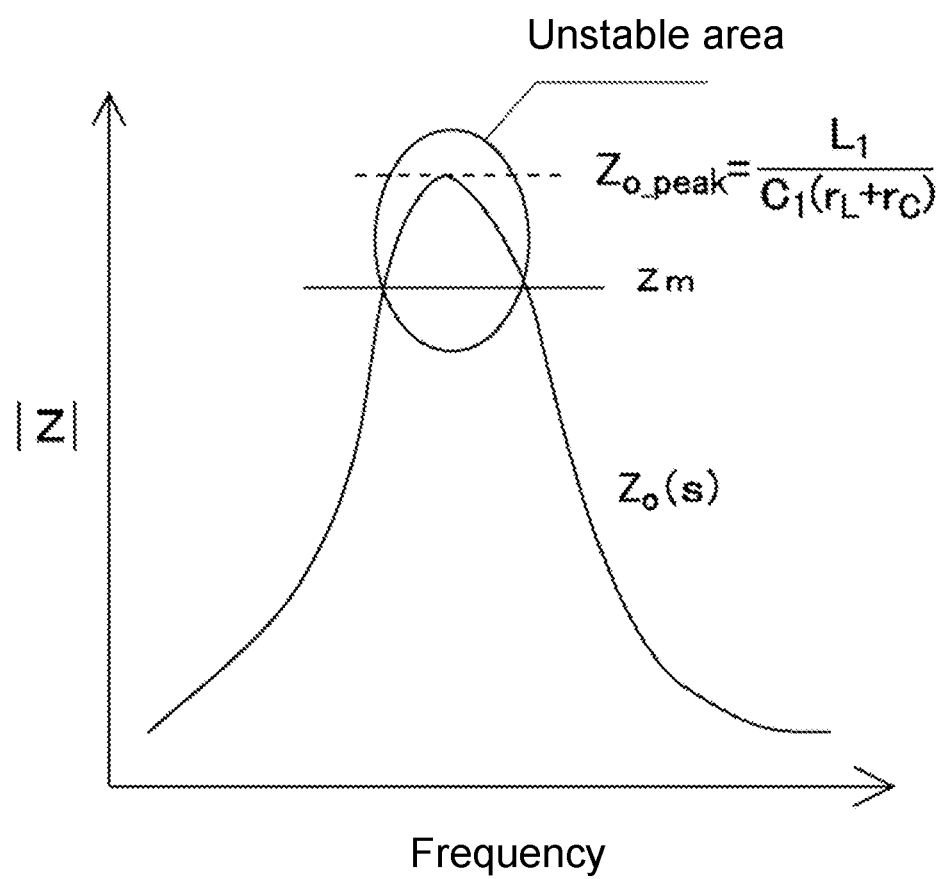
FIG. 7 is a graph showing an unstable area for the equivalent circuit shown in FIG. 6.

As shown in the graph of FIG. 7, the voltage on the power feeding path 35 is unstable in an area with the peak value $Z_{o\_peak}$>Zm. Thus, lowering the peak value $Z_{o\_peak}$ can reduce the likelihood of unstable voltages (voltage fluctuations) on the power feeding path 35.

Figure 8:
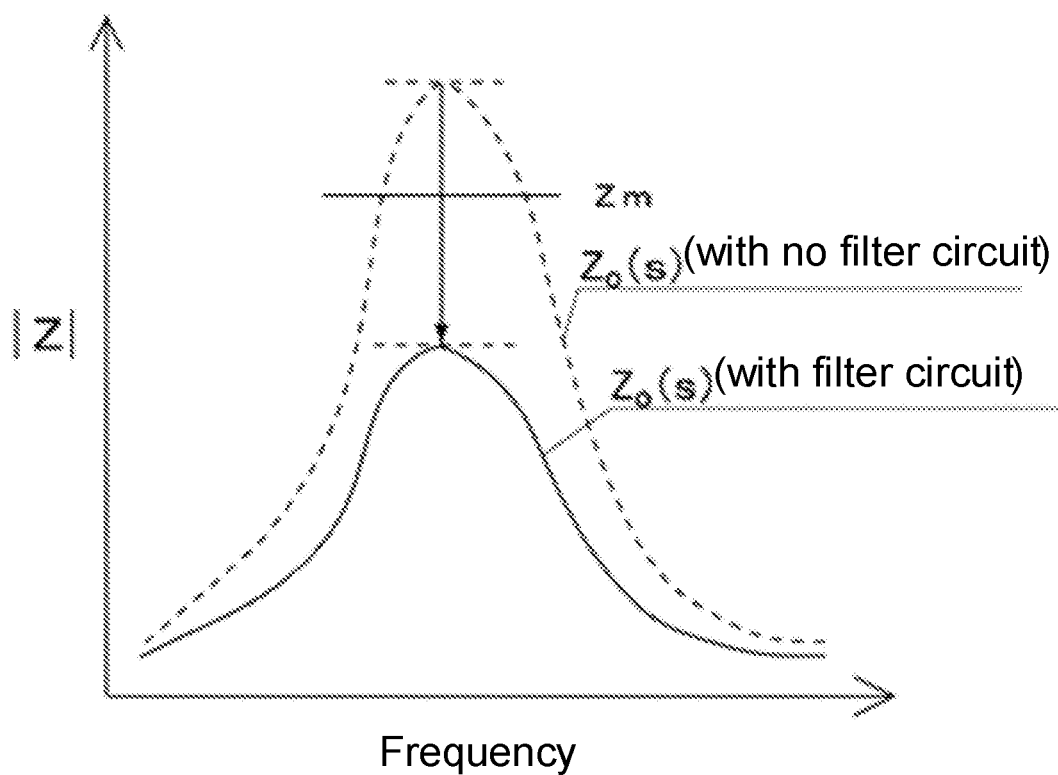
FIG. 8 is a graph describing the functions of a filter circuit.

The stabilizers 81 each including the transistor 24 in the filter circuit 32 and the stabilizers 82 each including the transistor 24 in the filter circuit 32A can change, through switching control over the respective transistors 24, the impedance on the power feeding path 35 to which the filter circuit 32 or 32A is connected. The control circuit 21 then detects voltage or current fluctuations on the power feeding path 35 and performs switching control over the transistors 24 to cause the peak value $Z_{o\_peak}$ to be below the value Zm based on the detection results as shown in FIG. 8. This reduces unstable voltages (voltage fluctuations) on the power feeding path 35.

Third Embodiment

Figure 9:
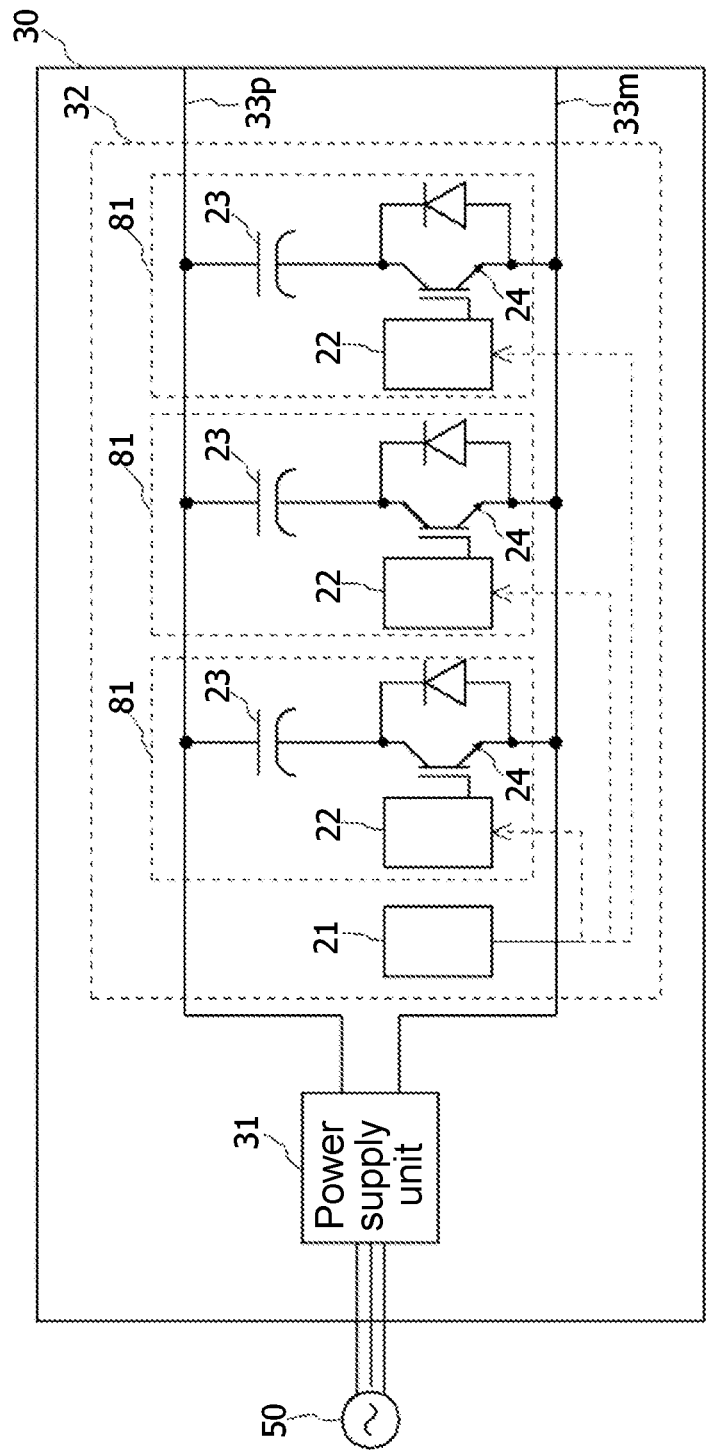
FIG. 9 is a first schematic diagram of another motor controller included in the servo DC power supply system.
Figure 10:
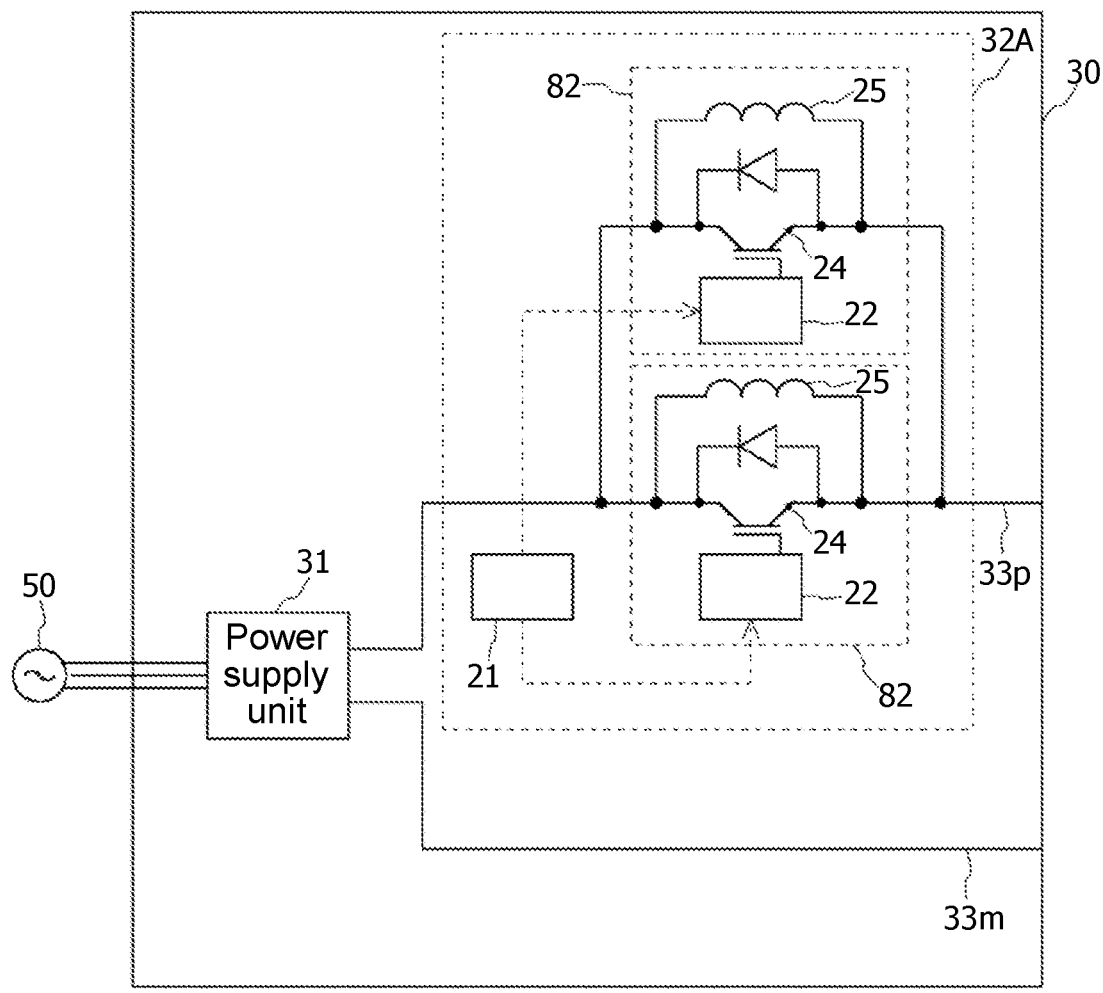
FIG. 10 is a second schematic diagram of another motor controller included in the servo DC power supply system.

Although the filter circuit 32 or 32A is included in the motor controller 10 in the first embodiment, the filter circuit 32 or 32A in the present embodiment is included in the DC power supply 30 as shown in FIGS. 9 and 10. The filter circuits 32 and 32A have the structures described in the first embodiment. In FIG. 9, the filter circuit 32 is included in the DC power supply 30. The filter circuit 32 is placed at a connection to the power feeding path 35. The filter circuit 32 receives DC power from the power supply unit 31 and outputs the DC power to the power feeding path 35. In FIG. 10, the filter circuit 32A is placed on a positive power line 33p in the DC power supply 30. The filter circuit 32A is placed at a connection to the positive power line 33p of the power feeding path 35. The filter circuit 32A receives DC power from the power supply unit 31 and outputs the DC power to the power feeding path 35. The filter circuit 32A may be placed on a negative power line 33m in the DC power supply 30.

The switching control over the transistors 24 performed by the control circuit 21 in a third embodiment will now be described with reference to FIG. 4. In S101, speed information (information about the rotation speed) is obtained for all the motors 40 driven in the servo DC power supply system shown in FIG. 1. More specifically, speed information for each of the three motors 40 is provided to the control circuit 21 from the motor controller 10 corresponding to the motor 40.

In S102, the determination is performed as to whether the resonance frequency of the filter circuit 32 is to be adjusted. The processing advances to S103 in response to an affirmative determination result obtained in S102, and advances to S104 in response to a negative determination result obtained in S102. In S103, the switching state of the transistor 24 included in each stabilizer 81 in the filter circuit 32 is changed to have the resonance frequency on the power feeding path 35 out of the predetermined frequency range having the center frequency being the frequency of the drive current of each of the three motors 40. In S104, the switching state of the transistor 24 included in each stabilizer 81 in the filter circuit 32 is maintained due to a lower likelihood of resonance causing voltage fluctuations on the power feeding path 35.

As described above, the control circuit 21 controls the switching of the transistors 24 to allow the resonance frequency on the power feeding path 35 to be out of the predetermined frequency range having the center frequency being the frequency of the drive current based on the rotation speed of the motors 40. This structure effectively avoids voltage fluctuations on the power feeding path 35 caused by the resonance of the DC voltage resulting from motor driving. The resonance frequency on the power feeding path 35 may fall within the predetermined frequency range having the center frequency being the frequency of the drive current of each of the three motors 40 although the switching state of the transistor 24 included in each stabilizer 81 in the filter circuit 32 is adjusted. In this case, the switching state of each transistor 24 may be adjusted to maximize the difference between the frequency of the drive current of each of the three motors 40 and the resonance frequency on the power feeding path 35. When one of the three motors 40 greatly affects fluctuations in the DC voltage on the power feeding path 35 (e.g., one motor 40 having a higher drive current than the other motors 40), the control shown in FIG. 4 may be performed simply based on the speed information about the motor 40 that greatly affects fluctuations.

In the present embodiment as well, information input into the control circuit 21 may be information about the PWM frequency of the inverter 11, instead of the information about the rotation speed of the motor 40. The control circuit 21 then controls the switching of the transistors 24 based on the information about the PWM frequency to reduce voltage fluctuations on the power feeding path 35 caused by the switching operation in the inverter 11.

Fourth Embodiment

Figure 11:
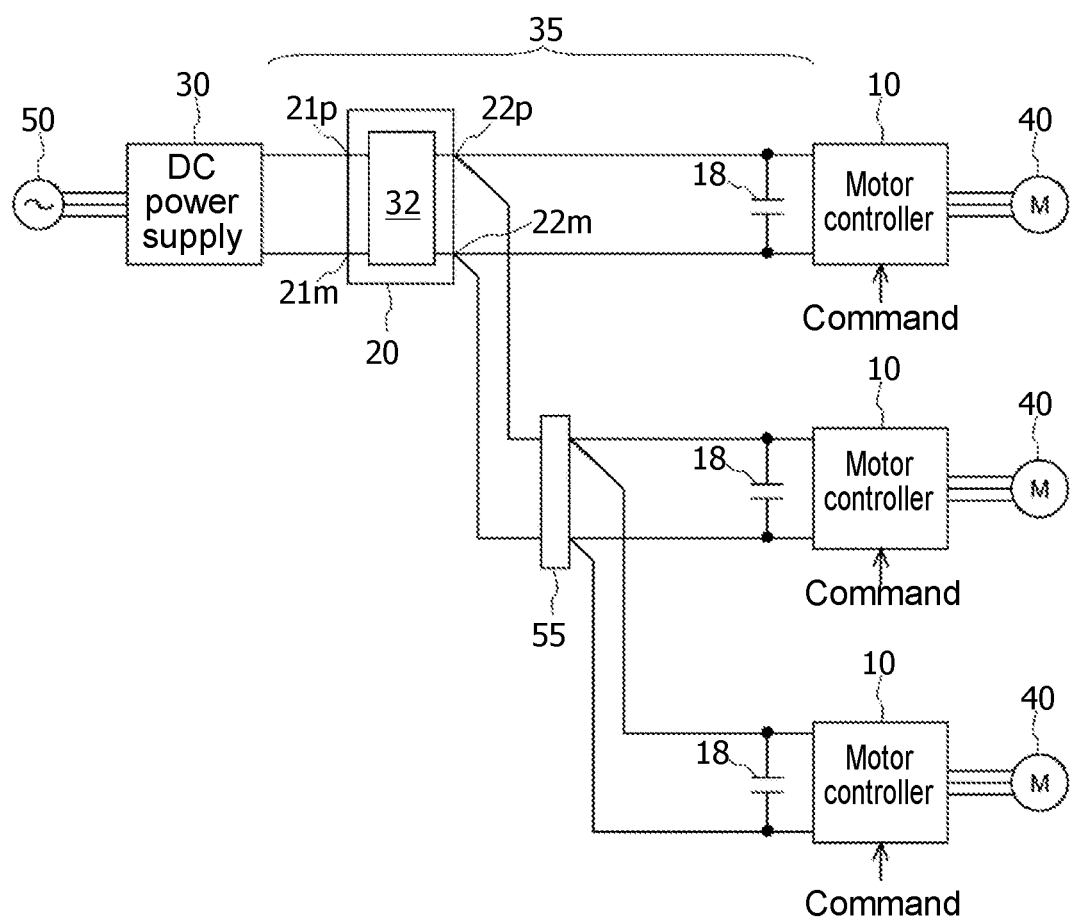
FIG. 11 is a first schematic diagram of a servo DC power supply system according to another embodiment of the present invention.
Figure 12:
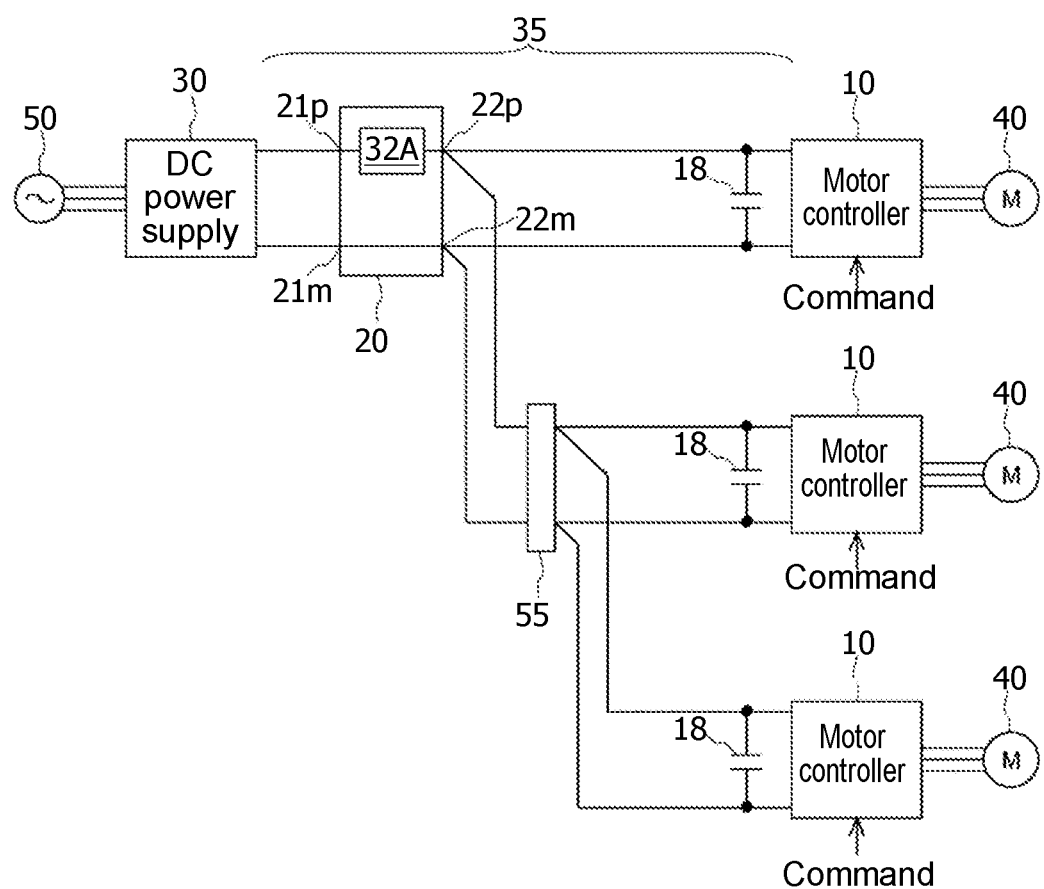
FIG. 12 is a second schematic diagram of a servo DC power supply system according to another embodiment of the present invention.

Although the filter circuit 32 or 32A is included in the DC power supply 30 in the first embodiment, the filter circuit 32 or 32A in the present embodiment is included in a connector 20 on the power feeding path 35 as shown in FIGS. 11 and 12. The filter circuits 32 and 32A have the structures described in the first embodiment.

In FIG. 11, the filter circuit 32 is included in the connector 20 placed on the power feeding path 35. The connector 20 includes a pair of input terminals 21p and 21m for connecting the upstream power cable (adjacent to the DC power supply 30). The input terminal 21p is a positive input terminal. The input terminal 21m is a negative input terminal. The connector 20 further includes a pair of output terminals 22p and 22m for connecting the downstream power cable. The output terminal 22p is connected to the input terminal 21p, and the output terminal 22m is connected to the input terminal 21m by internal wiring of the connector 20. The connector 20 includes the internal wiring with branching wires and terminals connected to the branching wires for connection to the power feeding path 35 for other motor controllers 10. The connector 20 includes the filter circuit 32 at a connection to the power feeding path 35. The filter circuit 32 receives DC power on the power feeding path 35 and outputs the DC power to the motor controller 10 from the DC power supply 30.

The power feeding path 35 includes a connector 55 located downstream from the connector 20 for further branching the feeding path. However, a known connector for branching the feeding path is used as the connector 55. This connector does not include the filter circuit 32. In some embodiments, the connector 55 may also include the filter circuit 32.

In FIG. 12, the filter circuit 32A is included in the connector 20 on the power feeding path 35. The connector 20 has a pair of input terminals 21p and 21m for connecting the upstream power cable (adjacent to the DC power supply 30) and a pair of output terminals 22p and 22m for connecting the downstream power cable. The output terminal 22p is connected to the input terminal 21p, and the output terminal 22m is connected to the input terminal 21m by internal wiring of the connector 20. The connector 20 includes the filter circuit 32A at a connection to the power feeding path 35. The filter circuit 32A receives DC power on the power feeding path 35 and outputs the DC power to the motor controller 10 from the DC power supply 30. The feeding path at each of the connectors 20 and 55 in FIG. 12 may branch in the same manner as shown in FIG. 11.

This structure allows the control circuit 21 included in the filter circuit 32 or 32A to control the switching of the transistors 24, thus effectively avoiding voltage fluctuations on the power feeding path 35 caused by the resonance of the DC voltage resulting from motor driving.

APPENDIX 1

A processing apparatus for reducing voltage fluctuations on a power feeding path (35) for feeding power from a direct current power supply (30) to at least one motor controller (10), the apparatus comprising:
 a filter circuit (32, 32A) including a plurality of predetermined units (81, 82) each including a circuit element (23, 25) and a semiconductor switch (24), the circuit element (23, 25) including at least a predetermined capacitor or a predetermined inductor, the semiconductor switch (24) being configured to control a current to be fed to the circuit element (23, 25), the filter circuit (32, 32A) being connected to the power feeding path (35); and
 a controller (21) configured to control switching of the semiconductor switch (24) included in each of the plurality of predetermined units (81, 82) in the filter circuit (32, 32A) to reduce voltage fluctuations or current fluctuations of direct current on the power feeding path (35).

The invention claimed is:

1. A processing apparatus for reducing voltage fluctuations on a power feeding path for feeding power from a direct current power supply to at least one motor controller, the apparatus comprising:
 a filter circuit including a plurality of predetermined units each including a circuit element and a semiconductor switch, the circuit element including at least one predetermined passive element, the semiconductor switch being configured to control a current to be fed to the circuit element, the filter circuit being connected to the power feeding path; and
 a controller configured to control switching of the semiconductor switch included in each of the plurality of predetermined units in the filter circuit to reduce voltage fluctuations or current fluctuations of direct current on the power feeding path, wherein
 the filter circuit adjusts a resonance characteristic across the filter circuit by switching the semiconductor switch included in each of the plurality of predetermined units,
 the controller controls the switching of the semiconductor switch based on a rotation speed of a motor receiving a drive current fed from the at least one motor controller or a pulse-width modulation frequency of the at least one motor controller to reduce voltage fluctuations or current fluctuations of the direct current on the power feeding path, and the controller controls the switching of the semiconductor switch in each of the plurality of predetermined units to cause a resonance frequency on the power feeding path connected to the filter circuit to be out of a predetermined frequency range having a center frequency being a frequency of the drive current based on the rotation speed of the motor or the pulse-width modulation frequency in the at least one motor controller.

2. The processing apparatus according to claim 1, wherein each of the plurality of predetermined units is located between a positive wire and a negative wire included in the power feeding path.

3. The processing apparatus according to claim 1, wherein each of the plurality of predetermined units is connected to a positive wire or a negative wire included in the power feeding path.

4. The processing apparatus according to claim 1, wherein the at least one motor controller includes a plurality of motor controllers connected to the power feeding path, and power from the direct current power supply is distributed to the plurality of motor controllers.

5. The processing apparatus according to claim 1, further comprising:
a connector including a pair of input terminals and a pair of output terminals electrically connected to the pair of input terminals,
wherein the pair of input terminals and the pair of output terminals are connected to a positive wire and a negative wire included in the power feeding path.

6. An apparatus, comprising:
a direct current power supply;
at least one motor controller;
a power feeding path for feeding power from the direct current power supply to the at least one motor controller; and
a processing apparatus for reducing voltage fluctuations on the power feeding path, the processing apparatus comprising:
a filter circuit including a plurality of predetermined units each including a circuit element and a semiconductor switch, the circuit element including at least one predetermined passive element, the semiconductor switch being configured to control a current to be fed to the circuit element, the filter circuit being connected to the power feeding path; and
a controller configured to control switching of the semiconductor switch included in each of the plurality of predetermined units in the filter circuit to reduce voltage fluctuations or current fluctuations of direct current on the power feeding path, wherein
the filter circuit adjusts a resonance characteristic across the filter circuit by switching the semiconductor switch included in each of the plurality of predetermined units,
the controller controls the switching of the semiconductor switch based on a rotation speed of a motor receiving a drive current fed from the at least one motor controller or a pulse-width modulation frequency of the at least one motor controller to reduce voltage fluctuations or current fluctuations of the direct current on the power feeding path, the controller controls the switching of the semiconductor switch in each of the plurality of predetermined units to cause a resonance frequency on the power feeding path connected to the filter circuit to be out of a predetermined frequency range having a center frequency being a frequency of the drive current based on the rotation speed of the motor or the pulse-width modulation frequency in the at least one motor controller, and the processing apparatus is disposed in the direct current power supply to cause the power feeding path to receive an output from the filter circuit.

7. An apparatus, comprising:
a direct current power supply;
at least one motor controller;
a power feeding path for feeding power from the direct current power supply to the at least one motor controller; and
a processing apparatus for reducing voltage fluctuations on the power feeding path, the processing apparatus comprising:
a filter circuit including a plurality of predetermined units each including a circuit element and a semiconductor switch, the circuit element including at least one predetermined passive element, the semiconductor switch being configured to control a current to be fed to the circuit element, the filter circuit being connected to the power feeding path; and
a controller configured to control switching of the semiconductor switch included in each of the plurality of predetermined units in the filter circuit to reduce voltage fluctuations or current fluctuations of direct current on the power feeding path, wherein
the filter circuit adjusts a resonance characteristic across the filter circuit by switching the semiconductor switch included in each of the plurality of predetermined units,
the controller controls the switching of the semiconductor switch based on a rotation speed of a motor receiving a drive current fed from the at least one motor controller or a pulse-width modulation frequency of the at least one motor controller to reduce voltage fluctuations or current fluctuations of the direct current on the power feeding path,
the controller controls the switching of the semiconductor switch in each of the plurality of predetermined units to cause a resonance frequency on the power feeding path connected to the filter circuit to be out of a predetermined frequency range having a center frequency being a frequency of the drive current based on the rotation speed of the motor or the pulse-width modulation frequency in the at least one motor controller,
the at least one motor controller includes an inverter configured to convert direct current being fed into alternating current to drive a servo motor, and
the processing apparatus is disposed in the at least one motor controller to cause the inverter to receive an output from the filter circuit.

* * * * *